United States Patent [19]
Yokoi et al.

[11] Patent Number: 5,400,659
[45] Date of Patent: Mar. 28, 1995

[54] ELECTROMAGNETIC FLOWMETER AND MANUFACTURE METHOD OF SAME

[75] Inventors: Kazuaki Yokoi; Masatsugu Arai; Akiomi Kohno; Yuji Yoshitomi, all of Ibaraki; Yutaka Sakurai; Tamio Ishihara, both of Katsuta, all of Japan

[73] Assignee: Hitachi, Ltd., Tokyo, Japan

[21] Appl. No.: 12,472

[22] Filed: Feb. 2, 1993

[30] Foreign Application Priority Data

Feb. 5, 1992 [JP] Japan .................. 4-019787

[51] Int. Cl.⁶ .............................................. G01F 1/58
[52] U.S. Cl. .............................. 73/861.12; 73/861.08
[58] Field of Search .................. 73/861.08, 862.12

[56] References Cited

U.S. PATENT DOCUMENTS

| | | | |
|---|---|---|---|
| 3,323,363 | 6/1967 | Ketelsen | 73/861.12 |
| 3,750,468 | 8/1973 | Grauer | 73/861.12 |
| 4,513,624 | 4/1985 | McHale et al. | 73/861.12 |
| 4,631,969 | 12/1986 | Schmoock | 73/861.12 |
| 4,658,652 | 4/1987 | Picone et al. | 13/861.12 |
| 4,679,442 | 7/1987 | Kubota | 73/861.12 |
| 4,785,672 | 11/1988 | Picone | 73/861.12 |
| 4,914,950 | 4/1990 | Uematsu et al. | 73/861.12 |
| 4,920,795 | 5/1990 | Codazzi et al. | 73/861.12 X |
| 5,289,725 | 3/1994 | Brown | 73/861.12 |

FOREIGN PATENT DOCUMENTS

| | | |
|---|---|---|
| 0120145 | 10/1984 | European Pat. Off. . |
| 8310394 | 8/1984 | Germany . |
| 8524172 | 6/1985 | Germany . |
| 3627993 | 4/1987 | Germany . |
| 3704413 | 8/1987 | Germany . |
| 3835972 | 5/1989 | Germany . |
| 3843667 | 7/1989 | Germany . |
| 1-136025 | 5/1989 | Japan . |

*Primary Examiner*—Richard E. Chilcot, Jr.
*Assistant Examiner*—Elizabeth L. Dougherty
*Attorney, Agent, or Firm*—Antonelli, Terry, Stout & Kraus

[57] ABSTRACT

An electromagnetic flowmeter comprises a ceramic measuring tube through which fluid to be measured flows, a pair of electromagnetic coils disposed on the outer surface of the measuring tube in the central region thereof at diametrically opposite positions and generating a magnetic field in a direction perpendicular to the direction of flow of the fluid, a pair of measuring electrodes fixed to the outer surface of the measuring tube in the central region thereof at diametrically opposite positions and having electrode axes perpendicular to both the direction of flow of the fluid and the direction of the magnetic field, and a pair of metallic shields fixed to the outer surface of the measuring tube in surrounding relation to the measuring electrodes. A pair of the measuring electrodes and a pair of the metallic shields are fixed to the ceramic measuring tube by a reaction product due to an interface reaction with the ceramic measuring tube under heating.

8 Claims, 3 Drawing Sheets

F I G. 1
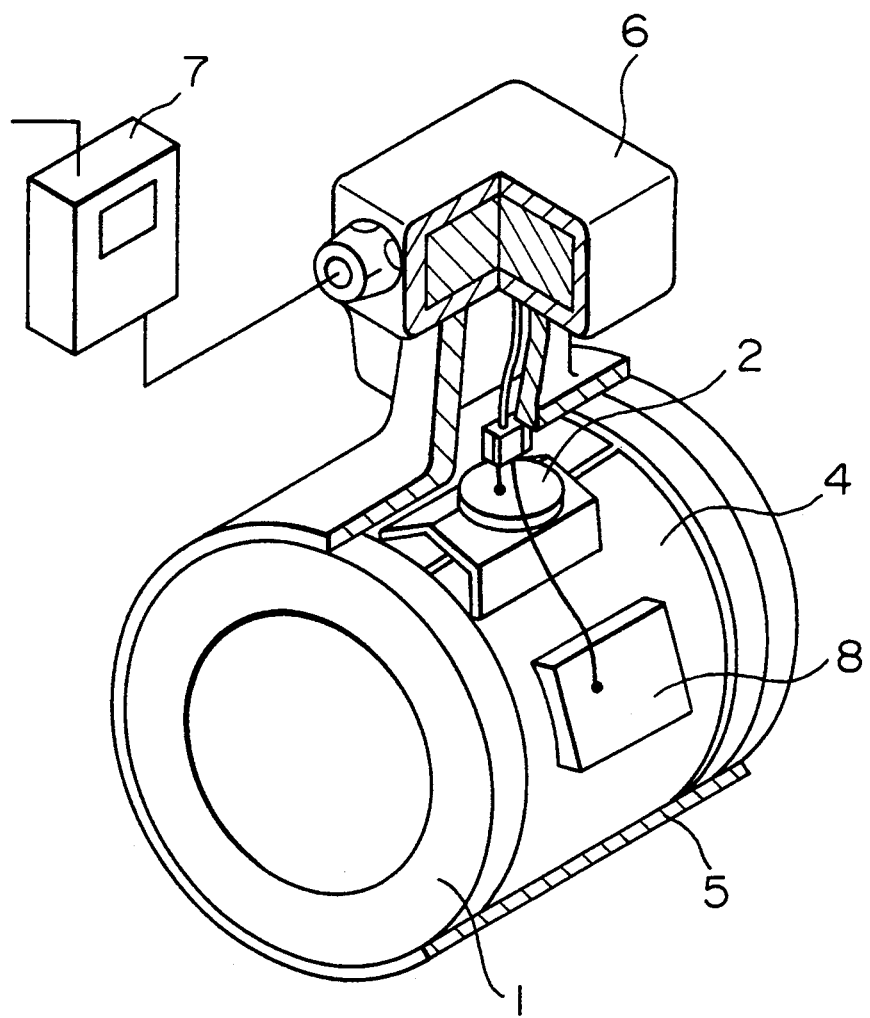

ELECTROMAGNETIC FLOWMETER AND MANUFACTURE METHOD OF SAME

BACKGROUND OF THE INVENTION

The present invention relates to an electromagnetic flowmeter and a manufacture method of the same, and more particularly to an electromagnetic flowmeter of the type that a measuring tube is made of ceramics and measuring electrodes are not in contact with fluid to be measured, as well as a method of manufacturing such an electromagnetic flowmeter.

Electromagnetic flowmeters are designed on the basis of the Faraday's law of induction that when an electrically conductive fluid flows perpendicularly to a magnetic field, a potential in proportion to a flow speed of the fluid is generated in a direction perpendicular to both the direction of the fluid flow and the direction of the magnetic field. Thus, the flow rate of fluid to be measured is determined by applying a magnetic field to the fluid to be measured, which is flowing through a measuring tube, to generate a potential, and detecting the potential by a pair of measuring electrodes. There are two types of electromagnetic flowmeters; one type that the measuring electrodes are in contact with the fluid to be measured, and another type that they are not in contact with the fluid to be measured. Also, the measuring tube is primarily made of ceramics superior in resistance against corrosion and heat.

One of contactless electromagnetic flowmeters using a ceramic-made measuring tube is proposed in U.S. Pat. No. 4,539,835.

In the proposed electromagnetic flowmeter of the above prior art, the outer surface of a measuring tube is coated with a metal, i.e., metallized, using the vacuum evaporation method to form measuring electrodes and shields.

However, because the metal films formed by the vacuum evaporation method is weak in the interface adhesion intensity with ceramics, peel-off between the metal films and the ceramics gradually progresses at the interface when the measuring tube is repeatedly subjected to heat. Accordingly, there arise a problem that measurement accuracy is degraded or fluctuated.

With a view of solving the above-mentioned problem, an object of the present invention is to provide an electromagnetic flowmeter in which the interface adhesion intensity between metal films, forming electrodes and shields, and ceramics is increased to such an extent as not causing peel-off at the interface even if repeatedly subjected to heat, and which is stable in capability of measurement, as well as a method of manufacture of such an electromagnetic flowmeter.

SUMMARY OF THE INVENTION

An electromagnetic flowmeter of the present invention comprises a ceramic measuring tube through which a fluid to be measured flows, a pair of electromagnetic coils disposed on the outer surface of the measuring tube in the central region thereof at diametrically opposite positions and generating a magnetic field in a direction perpendicular to the direction of flow of the fluid to be measured, a pair of measuring electrodes fixed to the outer surface of the measuring tube in the central region thereof at diametrically opposite positions and having electrode axes perpendicular to both the direction of flow of the fluid to be measured and the direction of the magnetic field, the measuring electrodes being fixed by a reaction product due to an interface reaction with the ceramic measuring tube under heating, and a pair of metallic shields fixed to the outer surface of the measuring tube in surrounding relation to the measuring electrodes by the reaction product due to an interface reaction with the ceramic measuring tube under heating.

When the ceramic measuring tube is formed of elements selected from alumina, zirconia, sialon (wherein "sialon" corresponds to Si—Al—O—N ceramics), silicon nitride and silicon carbide, the measuring electrodes and the shields are formed of elements selected from alloys containing titanium and an aluminum-silicon base alloy.

When the ceramic measuring tube is formed of elements selected from alumina and zirconia, the measuring electrodes and the shields are formed of elements selected from an alloy including molybdenum-manganese as a main constituent and an alloy including tungsten-manganese as a main constituent.

The measuring electrodes and the shields preferably have a thickness in the range of 10 $\mu$m to 500 $\mu$m when the outer diameter of the measuring tube is less than 100 mm, and in the range of 10 $\mu$m to 300 $\mu$m when the outer diameter of the measuring tube is not less than 100 mm.

When the measuring electrodes and the shields are made of an alloy containing titanium, the titanium content is preferably in the range of 1 weight % to 10 weight %.

A method of manufacturing an electromagnetic flowmeter according to the present invention comprises the steps of disposing the measuring electrodes and the shields at respective predetermined positions on the outer surface of the ceramic measuring tube, and heating the ceramic measuring tube, the measuring electrodes and the shields together, and fixing the measuring electrodes and the shields by a reaction product due to an interface reaction with the ceramic measuring tube.

The ceramic measuring tube, the measuring electrodes and the shields may be heated under a condition that the measuring electrodes and the shields are pressed against the ceramic measuring tube.

When the measuring tube is formed of elements selected from alumina and zirconia, and the measuring electrodes and the shields are formed of elements selected from an alloy containing molybdenum-manganese as a main constituent and an alloy containing tungsten-manganese as a main constituent, the measuring electrodes and the shields may be disposed on the outer surface of the ceramic measuring tube prior to sintering of the ceramic measuring tube, and the ceramic measuring tube, the measuring electrodes and the shields may be heated together at the time of sintering the ceramic measuring tube.

The measuring electrodes and the shields may be disposed on the outer surface of the ceramic measuring tube by vapour-deposition.

The measuring electrodes and the shields may be disposed on the outer surface of the ceramic measuring tube by screen printing.

When the measuring electrodes and the shields consist of titanium and a silver-copper alloy, the measuring electrodes and the shields may be disposed on the outer surface of the ceramic measuring tube by vapour-depositing the titanium on the outer surface of the ceramic measuring tube and disposing the silver-copper alloy on the titanium.

Another method of manufacturing an electromagnetic flowmeter according to the present invention comprises the steps of disposing a metal layer on an outer surface of the ceramic measuring tube, heating the metal layer and the ceramic measuring tube to develop an interface reaction between the metal layer and the ceramic measuring tube for fixing the metal layer to the outer surface of the ceramic measuring tube by a reaction product due to the interface reaction, and removing parts of the fixed metal layer by etching to form the measuring electrodes and the shields.

BRIEF DESCRIPTION OF THE DRAWINGS

FIG. 1 is a perspective view, partly sectioned, of an electromagnetic flowmeter according to the present invention.

DESCRIPTION OF THE PREFERRED EMBODIMENTS

Figure 2:
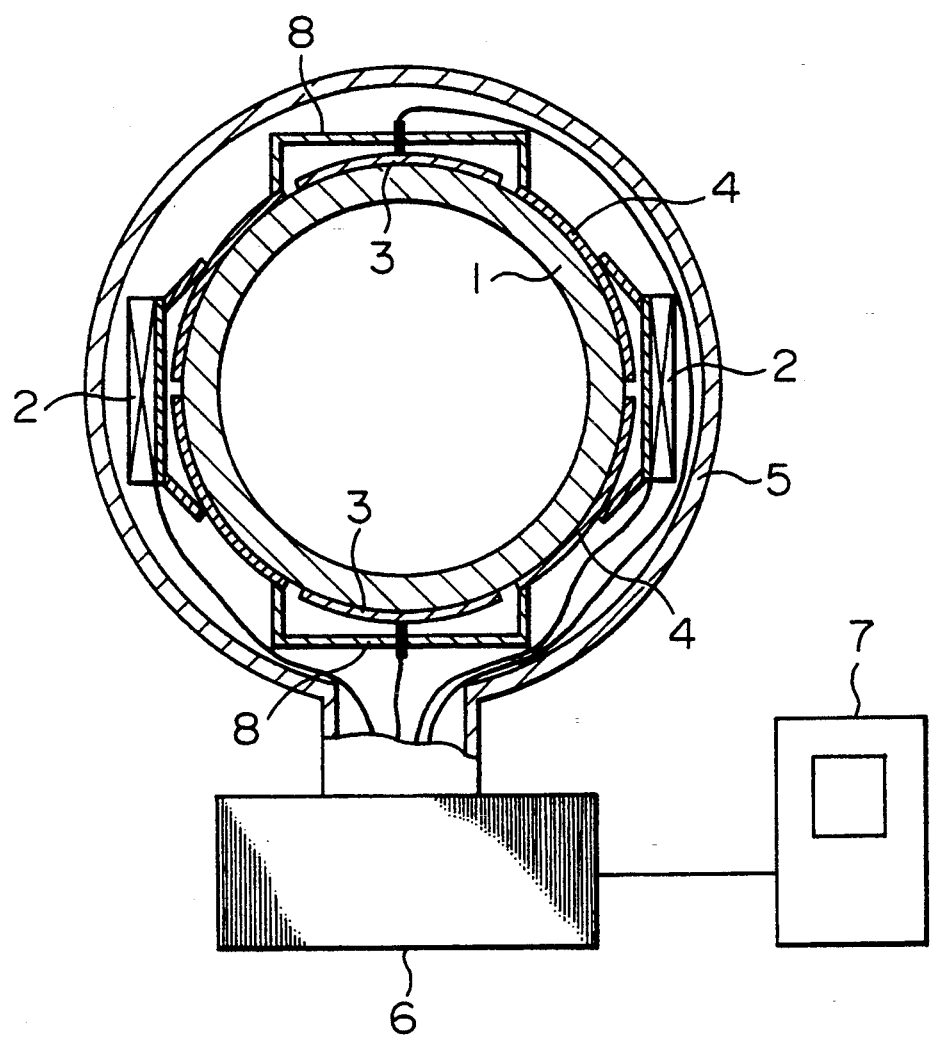
FIG. 2 is a sectional view of the electromagnetic flowmeter according to the present invention.

Hereinafter, preferred embodiments of an electromagnetic flowmeter according to the present invention will be described with reference to the attached drawings.

Example 1

An electromagnetic flowmeter of this Example comprises a measuring tube 1 through which fluid to be measured flows, a pair of electromagnetic coils 2 for applying a magnetic field to the fluid, a pair of measuring electrodes 3 for detecting a potential produced in the fluid passing through the magnetic field, shields 4 for shielding other magnetic fields which otherwise may adversely affect measurement of the potential by the measuring electrodes, shield covers 8 insulated from the measuring electrodes 3 and connected to the shields 4 in such a manner as to cover the measuring electrodes, a case 5 housing therein all the above components, and a terminal box 6 in which are encased terminals for transmitting the potential, detected by the measuring electrodes 3, to a converter 7.

Figure 3:
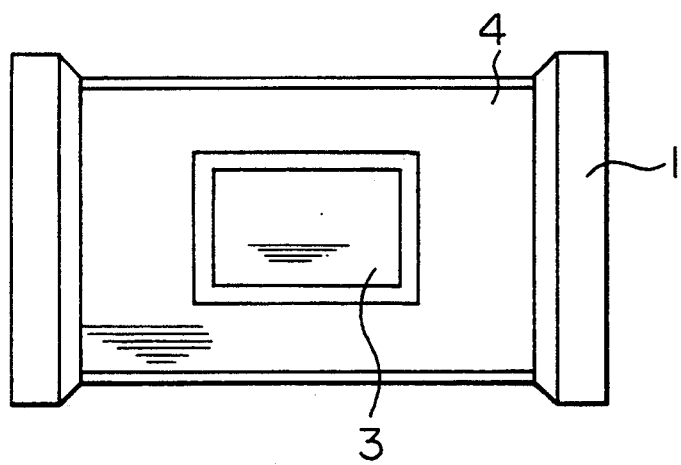
FIG. 3 is a side view of a measuring tube according to the present invention.

As shown in FIG. 3, the measuring tube 1 was formed of sintered alumina ceramics and sized to have an inner diameter of 50 mm, an outer diameter of 60 mm and a length of 100 mm with its flanges at both ends having an outer diameter of 65 mm. The electrodes and the shields were formed as follows. First, an outer circumferential surface of the alumina measuring tube 1 was masked such that the measuring electrodes 3 were each formed in an area of 30 mm in the axial direction and 20 mm in the circumferential direction nearly about the axial center of the outer circumferential surface of the measuring tube, and the remaining area up to the roots of the opposite flanges are formed the shields with a gap of 2 mm left around each measuring electrode 3. Then, a 2-mm wide masking was applied to boundaries between a pair of the shields 4. Subsequently, powder of a 70 wt % Ag—28 wt % Cu—2 wt % Ti alloy was prepared in the form of a paste and coated by a brush over the outer circumferential surface of the alumina measuring tube so as to provide a thickness of about 0.2 mm. Thereafter, the coated paste was heated under vacuum of $10^{-2}$ Pa and held at 850° C. for 10 minutes, followed by cooling in the vacuum. In that process, alumina and titanium showed a chemical reaction at the interface therebetween by being heated, whereby they were fixed together by $TiO_2$ reaction product. The electrodes and the shields thus obtained had a thickness not uniform entirely and ranging from 40 to 100 $\mu$m. The measuring tube 1 fabricated in this way was built in the electromagnetic flowmeter shown in FIG. 1 and accuracy of the flow rate measurement was tested. The test was conducted by using a magnetic circuit designed to produce a potential of 200 $\mu$V between the measuring electrodes when the flow rate of the fluid is 1 m/sec and varying a source voltage from AC 85 to 120 V. As a result, variations in the produced potential and variations in the zero point were as small as 0.04% and 0.07% of the design potential 200 $\mu$V, respectively. Also, even with the source frequency fluctuating ±3 Hz for each of 50 Hz and 60 Hz, variations in the produced potential were as small as 0.02% and 0.08% of the design potential 200 $\mu$V, respectively. It was thus found that a high degree of measurement accuracy was obtained.

Further, the electromagnetic flowmeter was built in a device through which vapor at a temperature of 160° C. and tap water at a temperature of 20° C. flow alternately, to conduct a heat cycle test of repeating quick-heating and quick-cooling steps 2000 times. As a result, no degradation of the above measurement accuracy appeared and no peel-off of both the electrodes and the shields were found. It was thus confirmed that the electrodes and the shields had sufficient durability.

While alumina was used as material for the measuring tube 1 in this Example, similar results were also obtained in any cases using zirconia, silicon nitride, silicon carbide and sialon (wherein "sialon" corresponds to a Si—Al—O—N ceramics).

On the other hand, the measuring electrodes 3 and the shields 4 were formed by changing the Ti amount in the alloy of 70 wt % Ag—Cu—Ti used in this Example to 0.3, 0.5, 1.0, 2.0 and 5.0 wt %, and then subjected to the measurement accuracy test and the heat cycle test repeating quick-heating and quick-cooling steps in a like manner to the above. As a result, while no difference was found in the measurement accuracy at the initial stage, the measuring electrodes containing 0.5% Ti locally showed peel-off at the joined interface between the measuring electrodes 3 and the measuring tube 1 after 450 times of heat cycles, and the measurement value was so fluctuated as to cause a failure in accuracy. No abnormality was found in the others even after 2000 times of heat cycles. It is thus concluded that the Ti amount in the alloy of Ag—Cu—Ti is required to be not less than 1.0 wt % and its upper limit is desirably not larger than 10 wt % to avoid a failure in bonding when signal lines are joined to the measuring electrodes 3 by soldering, etc. or when the shield covers 8 are soldered to the shields 4.

Example 2

The measuring tube 1 was formed in the same dimensions as those in Example 1 but using silicon nitride as material. Ti was entirely vapour deposited over the outer circumferential surface of the measuring tube other than the flanges with a thickness of 2 $\mu$m by using the high-frequency sputtering method. Subsequently, powder of a 70 wt % Ag—20 wt % Cu alloy was prepared in the form of a paste and coated uniformly by a screen printing process over the deposited Ti to provide a thickness of about 0.5 mm, followed by heating at 850° for 10 minutes under an atmospheric argon gas at atmospheric pressure. In that process, silicon nitride and titanium showed an interface reaction therebetween, whereby they were fixed together by TiN reaction product. Thereafter, such areas of the outer circumferential surface of the measuring tube as corresponding to the measuring electrodes 3 and the shields 4 were masked by resin so that the electrodes and the shields have the same dimensions as those in Example 1. Then, a solution of 15% ferric chloride was sprayed onto the outer circumferential surface of the measuring tube, whereby the measuring electrodes 3 and the shields 4 were formed through etching. As a result of conducting the accuracy measurement and the heat cycle test repeating quick-heating and quick-cooling steps in a like manner to Example 1, the measurement accuracy was degraded on the order of 0.01 to 0.02% for each of the test items in comparison with Example 1.

On the other hand, as a result of the heat cycle test conducted in a like manner to Example 1, no abnormality such as peel-off was found even after repeating the heat cycle 2000 times.

While silicon nitride was used as material for the measuring tube 1 in this Example, similar results were also obtained in any cases of using alumina, zirconia, silicon carbide and sialon.

Example 3

In this Example, adhesion of the electrodes and the shields was studied while changing the outer diameter of the measuring tube and the thickness of the electrodes and the shields. The results are as follows.

The measuring tube 1 was formed using sialon as a material into a simple cylindrical shape with no flanges, and sized to have a wall thickness of 5 mm, a length of 150 mm and one of seven different outer diameters shown in Table 1 below.

TABLE 1

| Outer diameter of measuring tube (mm) | Thickness of the shields ($\mu$m) |
| --- | --- |
| 30 | 5, 10, 50, 100, 300, 500, 700 |
| 50 | 10, 50, 100, 200, 300, 500, 700 |
| 70 | |
| 100 | |
| 150 | |
| 200 | |
| 250 | |

Only a pair of the shields 4 were formed on the outer circumferential surface of each measuring tube with a 2-mm wide gap left therebetween. The Ag—Cu—Ti alloy in Example 1 was used as a material, and the same screen printing and heating processes as those in Example 2 were employed. The measuring tubes were subjected to the heat cycle test repeating quick-heating and quick-cooling steps 2000 times at maximum in a like manner to Example 1, and a peel-off condition of the shields were observed. The results are shown in FIG. 4.

Figure 4:
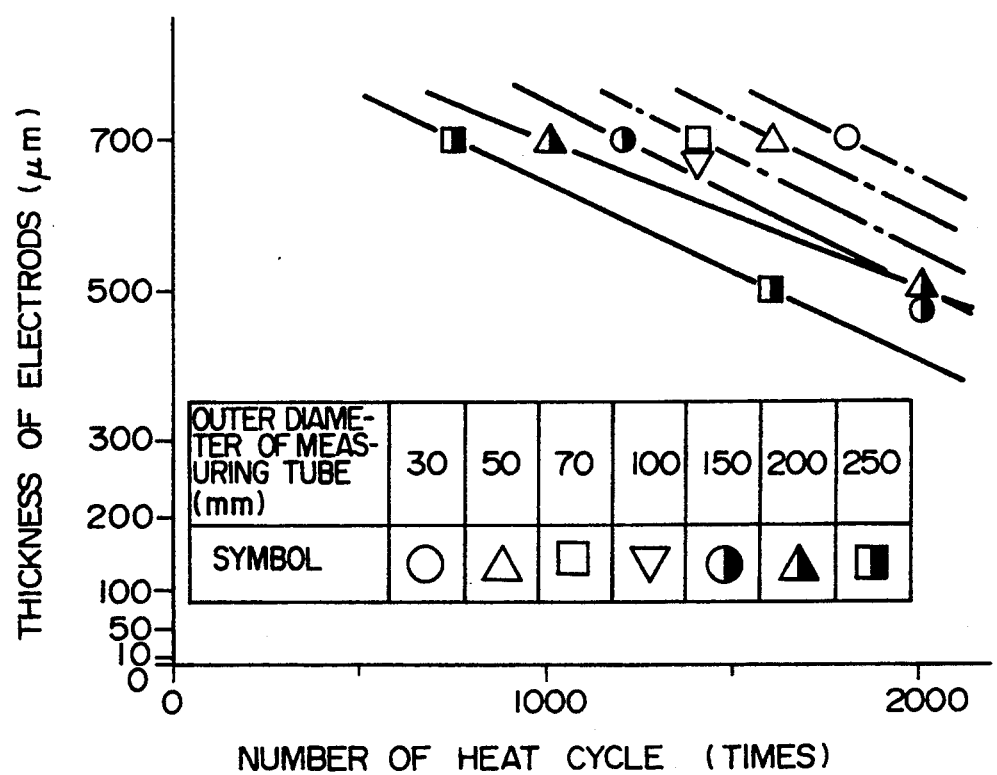
FIG. 4 is a graph representing results of adhesion tests for electrodes and shields in the present invention.

FIG. 4 indicates the number of repeated heat cycles at the time when peel-off was caused as a result of observing the shields on the measuring tubes by a microscope per 250 times in the range of 500 to 1000 times and per 200 times in the range of 1000 to 2000 times.

For the measuring tubes having the outer diameter not larger than 100 mm, the data indicating the occurrence of peel-off was only one. Therefore, peel-off limit lines were represented by one-dot-chain lines through estimation from the results on the measuring tubes having the outer diameter of 150 to 250 mm.

The measuring tubes having the outer diameter of 30 to 100 mm caused peel-off for the shield thickness of 700 $\mu$m in such a state that sialon near the joined interface adhered to the shields at the edges thereof. However, no peel-off was found for the shields not larger than 500 $\mu$m. Meanwhile, the measuring tubes having the outer diameter not less than 150 mm caused peel-off for the shields 500 $\mu$m as well.

From the test results of FIG. 4, it is understood that peel-off does not occur for the thickness of the electrodes and the shields not larger than 500 $\mu$m when the measuring tubes have the outer diameter not larger than 100 mm, and for the thickness not larger than 300 $\mu$m when the measuring tubes have the outer diameter in the range of 100 to 250 mm.

In the case where the thickness of the electrodes and the shields is 5 $\mu$m, the electrodes and shields are not formed partly. For this reason, the thickness of the electrodes and the shields is desirably not less than 10 $\mu$m.

Note that while sialon was used as material for the measuring tube and the Ag—Cu—Ti alloy was used as material for the electrodes and the shields in this Example, similar results were also obtained in any cases of using alumina, zirconia, silicon nitride and silicon carbide as material for the measuring tube, and in any case of using an Al—Si alloy as material for the electrodes and the shields.

Different from an Ag—Cu—Ti alloy, in a case where a molybdenum-manganese alloy or tungsten-manganese containing alloy was used as material for the electrodes and the shields, similar results were also obtained even if the thickness of the electrodes and the shields was more than 5 $\mu$m.

Example 4

The measuring tube used in this Example had the same shape and dimensions as those in Example 1, was formed using zirconia as ceramics material, and included the measuring electrodes 3 and the shields 4 having the same shapes as those in Example 1. Aluminum brazing material with a thickness of 0.16 mm was used as material for the electrodes and shields. This aluminum brazing material was in the form of a three-layer sheet comprising opposite surface layers which are each made of an Al—10% Si—2% Mg alloy and 16 $\mu$m thickness, and a core layer which is made of an Al—Mn alloy having a higher melting point than the surface layers. The aluminum brazing material was machined into the same shapes as those of the electrodes and shields in Example 1 and disposed around the outer circumferential surface of the measuring tube 1. A two-split pressing jig made of graphite was disposed outside the aluminum brazing material with the mating faces of split parts aligned with gaps between the shields 4. The assembly in this condition was placed in a vacuum heating device where it was subjected to a pressing force of 2 MPa and held under vacuum of $10^{-2}$ Pa while being heated for 15 minutes at a temperature of 600° C. at which only the Al—10% Si—2% Mg alloy of the surface layers can be melted. Thereafter, because the Al surfaces of the surface layers had a difficulty in soldering between the measuring electrodes 3 and lead wires and between the shields 4 and the shield cases 8 in order to fabricate an electromagnetic flowmeter as shown in FIG. 1, at least those areas of the electrodes and the shields to be soldered were Ni-plated and the electromagnetic flowmeter was obtained by soldering. The accuracy measurement and the heat cycle test repeating quick-heating and quick-cooling steps were conducted on the obtained flowmeter in a like manner to Example 1. As a result, the measurement accuracy was equivalent to that in Example 1 and no abnormality was found even after 2000 times of heat cycles.

While the three-layer aluminum brazing material was used in Example 4, two-layer aluminum brazing material consisted of an Al—10% Si—2% Mg alloy and an Al—Mn alloy may be used instead.

Also, while the measuring tube was made of zirconia, alumina, silicon nitride, silicon carbide and sialon may be used as material for the measuring tube.

As an alternative, it is further possible to fix the aluminum brazing material throughout the outer circumferential surface of the measuring tube by heating, apply masks over those areas corresponding to the measuring electrodes and shields, and then etch away the remaining area using a 10% solution of hydrofluoric acid to thereby form the measuring electrodes and shields.

Example 5

A measuring tube used in this Example was preliminarily sintered, had the same shapes and dimensions as those in Example 1, and was made of alumina. Powder of a 80 wt % molybdenum-20 wt % manganese alloy was prepared in the form of a paste and coated by screen printing over those areas of tube surface corresponding to the measuring electrodes and the shields with a thickness of 200 $\mu$m. Then, the measuring tube was held under a hydrogen atmosphere for 4 hours at a temperature of 1500° C. to form the electrodes and the shield while sintering the ceramic.

After that, the areas of the electrodes and the shields were entirely Ni-plated or Cu-plated to facilitate soldering, and an electromagnetic flowmeter was obtained by attaching the case, the shield covers and so forth. This electromagnetic flowmeter was subjected to the accuracy measurement and the heat cycle test repeating quick-heating and quick-cooling steps in a like manner to Example 1. As a result, the measurement accuracy was equivalent to that in Example 1 and no peel-off was found in the electrodes and the shields even after 2000 times of heat cycles.

While the measuring electrodes 3 and the shields 4 were both formed with the same process in the above, another electromagnetic flowmeter was fabricated as follows. Only the measuring electrodes 3 were formed by the above-mentioned method, and the shields 4 were formed by applying a predetermined underlayer treatment and plating Ni with a thickness of 20 $\mu$m. As a result of conducting the accuracy measurement and the heat cycle test on the obtained electromagnetic flowmeter in a like manner, no differences from the results of the above case were found.

Furthermore, similar results could be obtained in the case of forming the measuring tube by using zirconia instead of alumina used in this Example. Also, similar results could be obtained in the case of forming the electrodes by using a tungsten-manganese alloy.

While the ceramic measuring tube not completely sintered was used in this Example, a ceramic measuring tube completely sintered may be used instead.

What is claimed is:

1. An apparatus comprising:
   a ceramic measuring tube through which fluid to be measured flows,
   a pair of electromagnetic coils disposed on an outer surface of said measuring tube at substantially a central longitudinal region thereof at diametrically opposite positions and generating a magnetic field in a direction perpendicular to a direction of flow of said fluid,
   a pair of measuring electrodes fixed to said outer surface of said measuring tube at substantially said central longitudinal region thereof at diametrically opposite positions and having electrode axes perpendicular to both said direction of flow of said fluid and said direction of said magnetic field, said measuring electrodes being fixed by a reaction product due to an interface reaction with said ceramic measuring tube under heating, and
   a pair of metallic shields fixed to said outer surface of said measuring tube in surrounding relation to said measuring electrodes by a reaction product due to an interface reaction with said ceramic measuring tube under heating,
   wherein said ceramic measuring tube is formed of at least one material selected from alumina, zirconia, sialon, silicon nitride and silicon carbide, and said measuring electrodes and said shields are formed of at least one material selected from alloys containing titanium and an aluminum silicon base alloy.

2. An apparatus according to claim 1, wherein said measuring electrodes and said shields have a thickness in a range of 10 $\mu$m to 500 $\mu$m when the outer diameter of said measuring tube is less than 100 mm, and in a range of 10 $\mu$m to 300 $\mu$m when said outer diameter of said measuring tube is not less than 100 mm.

3. An apparatus according to claim 1, wherein a content of said alloy is in a range of 1% to 10% titanium.

4. An apparatus according to claim 2, wherein said apparatus is an electromagnetic flowmeter.

5. An apparatus comprising:
   a ceramic measuring tube through which fluid to be measured flows,
   a pair of electromagnetic coils disposed on an outer surface of said measuring tube at substantially a central longitudinal region thereof at diametrically opposite positions and generating a magnetic field in a direction perpendicular to a direction of flow of said fluid,
   a pair of measuring electrodes fixed to said outer surface of said measuring tube at substantially said central longitudinal region thereof at diametrically opposite positions and having electrode axes perpendicular to both said direction of flow of said fluid and said direction of said magnetic field, said measuring electrodes being fixed by a reaction product due to an interface reaction with said ceramic measuring tube under heating, and
   a pair of metallic shields fixed to said outer surface of said measuring tube in surrounding relation to said measuring electrodes by a reaction product due to an interface reaction with said ceramic measuring tube under heating,
   wherein said ceramic measuring tube is formed of at least one material selected from alumina and zirconia, and said measuring electrodes and said shields are formed of at least one material selected from an alloy containing molybdenum-manganese as a main constituent and an alloy containing tungsten-manganese as a main constituent.

6. An apparatus according to claim 5, wherein said measuring electrodes and said shields have a thickness in an range of 5 μm to 500 μm when the outer diameter of said measuring tube is less than 100 mm, and in the range of 5 μm to 300 μm when said outer diameter of said measuring tube is not less than 100 mm.

7. An apparatus according to claim 5, wherein said apparatus is an electromagnetic flowmeter.

8. An apparatus comprising:
a ceramic measuring tube through which fluid to be measured flows,
a pair of electromagnetic coils disposed on an outer surface of said measuring tube at substantially a central longitudinal region thereof at diametrically opposite positions and generating a magnetic field in a direction perpendicular to a direction of flow of said fluid,
a pair of measuring electrodes fixed to said outer surface of said measuring tube at substantially said central longitudinal region thereof at diametrically opposite positions and having electrode axes perpendicular to both said direction of flow of said fluid and said direction of said magnetic field, said measuring electrodes being fixed by a reaction product due to an interface reaction with said ceramic measuring tube under heating, and
a pair of metallic shields fixed to said outer surface of said measuring tube in surrounding relation to said measuring electrodes by a reaction product due to an interface reaction with said ceramic measuring tube under heating,
wherein said ceramic measuring tube is formed of at least one material selected from alumina, zirconia, sialon, silicon nitride and silicon carbide, and said measuring electrodes and said shields are formed of at least one material selected from alloys containing titanium and an aluminum silicon base alloy;
wherein a content of said alloy is in a range of 1% to 10% titanium; and
wherein said alloy containing titanium contains silver-copper as a main constituent thereof.

* * * * *